United States Patent [19]

Weiner et al.

[11] Patent Number: 5,140,151
[45] Date of Patent: Aug. 18, 1992

[54] DAY/NIGHT SIGHT INCLUDING A BEAM COMBINER AND A PIVOTABLE MIRROR

[75] Inventors: Samuel Weiner, Gyvat Savion; Michael Dror, Tel-Aviv, both of Israel

[73] Assignee: Noga Lite, Holon, Israel

[21] Appl. No.: 572,125

[22] Filed: Aug. 23, 1990

[51] Int. Cl.⁵ .................. H01J 31/50; G02B 27/32
[52] U.S. Cl. .................. 250/213 VT; 359/419; 33/233
[58] Field of Search ............. 250/213 VT; 356/253, 356/254, 255, 142; 350/1.2, 538, 636; 33/233, 241, 245, 246, 250, 253, 297, 298; 359/353, 403, 419

[56] References Cited

U.S. PATENT DOCUMENTS

| | | | |
|---|---|---|---|
| 3,407,302 | 10/1968 | Bouwers | 350/538 |
| 3,712,702 | 1/1973 | Schmidt | 350/538 |
| 3,918,813 | 11/1975 | Rossiter | 33/241 |
| 4,658,139 | 4/1987 | Brennan et al. | 33/241 |
| 4,961,278 | 10/1990 | Johnson et al. | 250/213 VT |

*Primary Examiner*—David C. Nelms
*Assistant Examiner*—John R. Lee
*Attorney, Agent, or Firm*—James E. Bradley

[57] ABSTRACT

A dual function day/night sight for rifles and the like having a unified body. The sight comprises a housing incorporating a power supply, an eyepiece and objective lenses for producing a target image arranged coaxially, and the combination of an image intensifier and optical array arranged in fixed parallel position one to the other and interposed between the eyepiece and objective lenses. Image beam deflecting means are interposed between the objective lenses and the parallel combination. During nighttime use of the sight, the deflecting means are used to apply the incoming image beam to the image intensifier. During daytime use of the sight, the deflecting means are used to apply the incoming image beam to the optical array.

7 Claims, 2 Drawing Sheets

DAY/NIGHT SIGHT INCLUDING A BEAM COMBINER AND A PIVOTABLE MIRROR

BACKGROUND OF THE INVENTION

The present invention relates to sights, and more particularly to rifle-mountable dual-function, day/night sights.

Common daytime sights normally comprise a series of optical components, including at least an eyepiece and an objective lens, acting in a similar fashion to a telescope, for magnifying the target. Adjustments to the sight include an eyepiece adjustment, normally in the form of a diopter ring, for the accommodation of different users, eyesight, and a boresight-rifle setting control, consisting of knobs, for one-time alignments, along the X axis and the Y axis, between the line of sight and the rifle's barrel.

Nighttime sights necessarily include an image intensifier for generation of an illuminated image of the target, which would otherwise appear vague or even invisible due to the lack of ambient light.

Hence, a day/night sight requires two, at least partially separate image beam, channels, one for daytime and the other for nighttime use thereof. In order to save cost and lower the weight of the unit, it is common practice to reduce to a minimum the employment of optical components, particularly regarding the eyepiece and the objective lens—required for both modes of use—by combining portions of the daytime and nighttime image beam channels.

Various constructions of unitary-body, dual-function sights have been designed. Such constructions normally included a co-axial linear arrangement of an eyepiece and an objective lens, and a parallel combination of an optical relay and an image intensifier interposed therebetween. The parallel combination is mounted on a sliding mechanism wherein in a first position, the sight is prepared for nighttime use by aligning the image intensifier along the axis between the eyepiece and the objective, and in a second, shifted position, the sight is prepared for daytime use, by slidingly displacing the image intensifier and. replacing same by the optical relay.

Sights of this type suffer from numerous disadvantages, mainly attributable to inherent deficiencies in the required sliding mechanism. Thus, special and costly design solutions have had to be used to maintain the continued fine alignment required between the sight's optical components in spite of wear on the moving parts following prolonged use, as well as providing sliding contacts for the supply of electrical power to the image intensifier. From another aspect, the prior art devices were mostly equipped with a fixed aiming reticle, which interfered with or obstructed vision of the target at the center of the field of view.

SUMMARY OF INVENTION

It is therefore the major object of the invention to provide a dual-function day/night sight wherein the conversion between the daytime and nighttime modes of operation, and vice-versa, is achieved by a simple mechanical arrangement.

It is a further object of the invention that the said conversion be performed without requiring transposition between the daytime and the nighttime viewing components, i.e. that both remain stationary.

It is a still further object of the invention that no boresight or eyepiece adjustments be required for the different modes of operation.

It is a still further object of the invention that the sight be provided with an active aiming reticle, which can be attenuated by manual adjustment of a control knob external to the housing of the sight.

It is a still further object of the invention that the sight be lightweight and of a compact size.

According to the invention there is provided a unified-body, dual-function day/night sight for rifles and the like, comprising a housing incorporating a power supply, a co-axial arrangement of an eyepiece and an objective for producing a target image, a parallel combination of an image intensifier and an optical array interposed between said eyepiece and said objective, characterized by image beam deflecting means interposed between the parallel combination and the objective such that for nighttime use of the sight, the image beam is applied to the image intensifier and for daytime use of the sight, the image beam is applied to said optical array.

These and further constructional details and advantages of the invention will become more clearly understood in the light of the ensuing description of a preferred embodiment of the invention, with reference to the accompanying drawings.

DETAILED DESCRIPTION OF THE INVENTION

Figure 1:
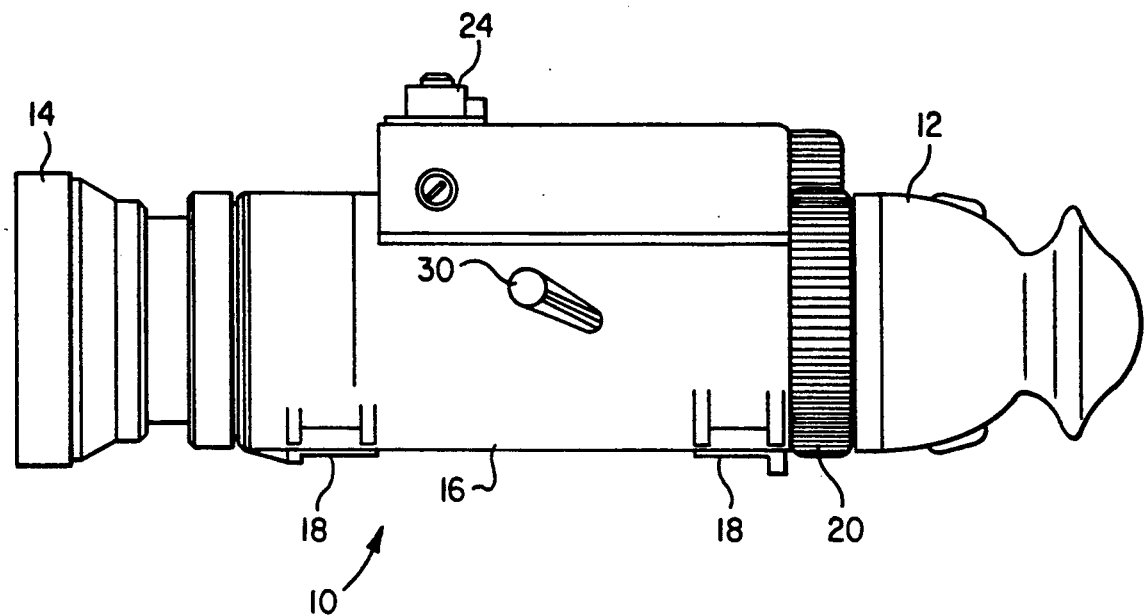
FIG. 1 is an elevation of a day/night sight housing in accordance with the present invention.
Figure 2:
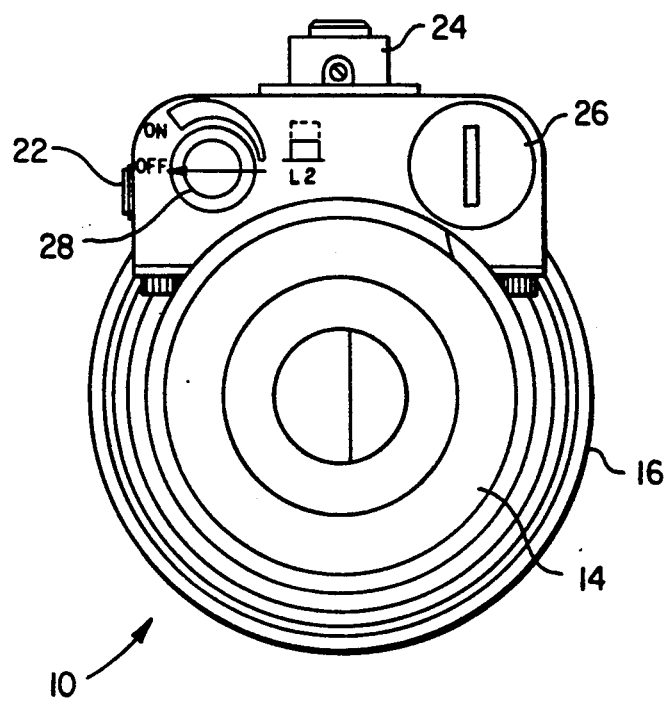
FIG. 2 is an end view of the sight of FIG. 1.

Referring now to FIGS. 1 and 2, there is shown a day/night sight unit comprised in a substantially cylindrical housing, generally denoted 10.

The housing 10 is of a conventional design and comprises a bellows-like eye-guard 12 and an objective lens 14, screwably threaded onto a central body portion 16 containing the components and systems of the sight.

The sight is adapted to be mounted on a rifle by means of mounts 18 provided at the underside of the body portion 16.

The adjustment controls of the optical components as described earlier include a diopter ring 20 for the eyepiece adjustment, and X and Y axis boresight-rifle alignment knobs 22 and 24, respectively.

Power is supplied to image intensifier 38, aiming reticle projector 44 and associated circuitry (see FIG. 3) by a battery housed in battery compartment 26.

Preferably the projector 44 is of the active type, namely the intensity of the reticle can be adjusted, or even extinguished by use of a combined on/off and reticle brightness control knob 28.

The conversion from the daytime mode to the nighttime mode of operation, and vice-versa, is by the application of a rotatable day/night lever 30 mounted on the side of the body portion 16, as will be explained in detail below.

Figure 3:
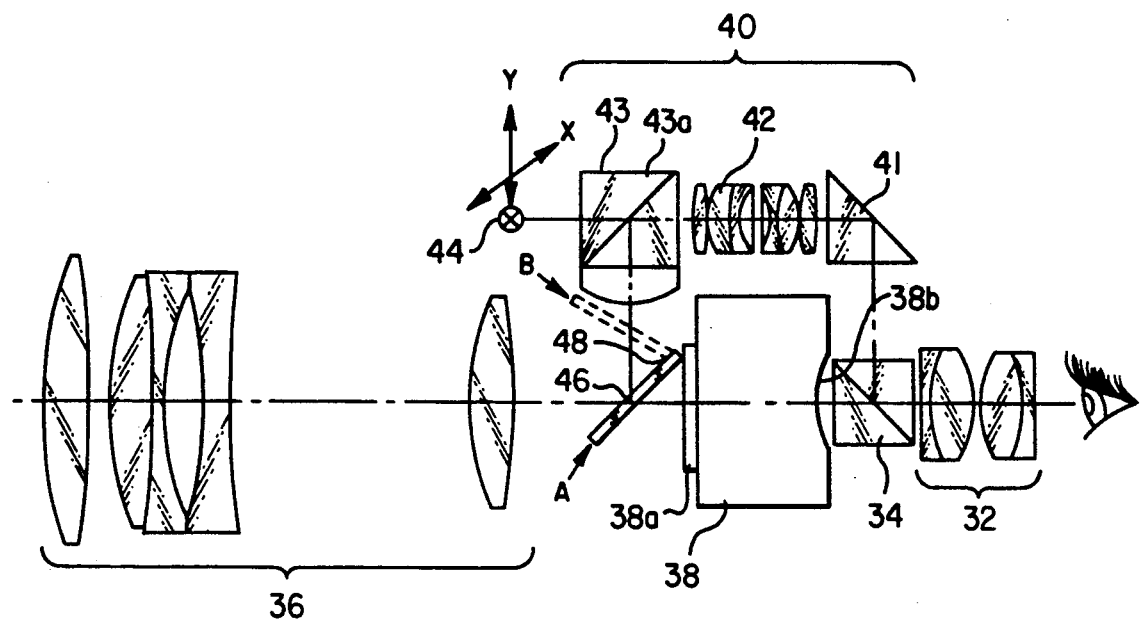
FIG. 3 illustrates a schematic optical diagram of the components of the sight of FIG. 1.

Turning now to FIG. 3, a schematic optical diagram of the components constituting the sight are shown.

The sight, as explained earlier, inherently requires two separate image beam channels for daytime and nighttime use. As further explained, a portion of the two channels is shared, being constituted by a co-axial serial arrangement of eyepiece lenses, generally denoted 32, beam combiner 34 and objective lens system 36.

The remaining portion of the image beam channel, during nighttime use of the sight, is through an image intensifier 38, for instance a so called "Starlight Stimulator" (SLS), co-axially interposed between the beam combiner 34 and objective 36.

The complementary, daytime used image beam channel, bypassing and parallel to the image intensifier 38, is through a linear optical array, generally denoted 40. The optical array 40 comprises in series a first folding prism 41, an optical relay 42 and a combined folding and beam combiner 43 (partly consisting of a second folding prism 43a).

As can also be readily seen in FIG. 3, the optical array and the beam combiner 34 are further operable to propagate the aiming reticle or red point from the projector 44 to the eyepiece 32.

All the optical components and associated parts so far described are generally known in the context of sights; however, in contradistinction to conventional designs—where at least one of the optical assemblies was displaceable—both assemblies are fixedly mounted within the body 10, and thus safeguarded against inadvertent relative movement therebetween resulting from shocks. Thus maintenance of high relative position precision is attained.

Figure 4:
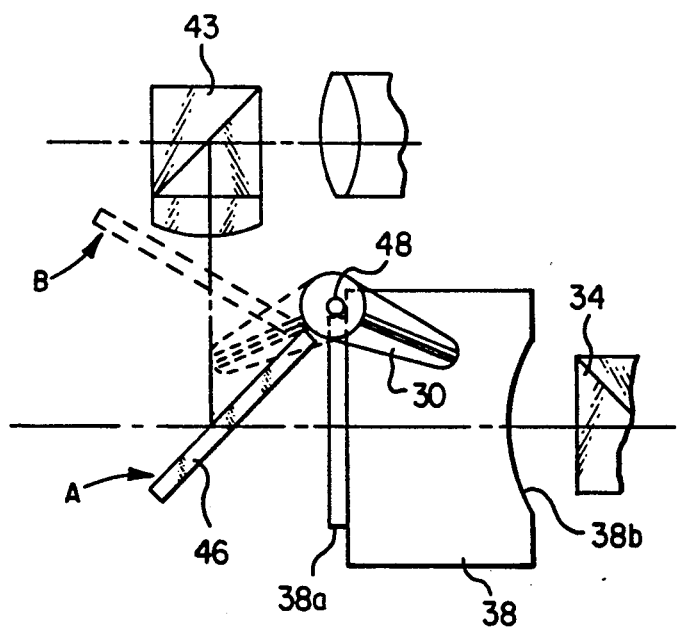
FIG. 4 shows a close-up view of part of the optical system.

Deflection of the incoming image beam from the linear channel through the image intensifier 38 used at night, to the complementary channel used in daytime is accomplished by means of a swingable or "flip-flop" mirror 46 installed in front of, but spaced away from, the intensifier 38, as more clearly seen in FIG. 4.

The mirror 46 is pivotedly mounted on axle 48, which extends normal to the longitudinal axis of the housing 10, and is operatively coupled to the day/night lever 30.

Thus, according to the setting of the day/night lever 30, the mirror 46 takes up either a position denoted A, or a position B as shown in broken lines in FIG. 3.

One necessary design feature of the sight is that sufficient room must be made available, by using an objective 36 having a long back focal length, so as to enable the rotational movement of the mirror 46.

During daytime use of the sight, the mirror 46, as shown in position A is positioned at 45° to the nighttime channel, thereby deflecting the incoming image beam to the combined folding and beam combiner 43, while at the same time masking entry to the image intensifier 38. The image beam, while being combined with the beam emitted from the projector 44, is then deflected through 90° to optical relay 42. Following propagation through relay 42, in an optical line parallel to the nighttime channel, the combined beam is deflected a further 90° by means of the folding prism 41 to the beam combiner 34 where it is then directed to the eyepiece 32 for viewing by the user.

It should be noted that the projected view of the mirror 46 must be of sufficient width to enable receipt of the full incoming image beam impinging thereon as relayed through the objective 36.

In position B, the mirror 46 swings back to clear the entrance plane 38a of the image intensifier 38 in preparation for the nighttime use of the sight. Hence, the incoming image beam impinges on the plane 38a and upon stimulation leaves at exit plane 38b, whereupon the image is combined with the aiming reticle at the beam combiner 34 and further applied to eyepiece 32.

The invention as can be readily understood thus provides a new design for a dual function day/night sight overcoming the many disadvantages of existing designs by employing simple, economic but most effective means.

Those skilled in the art to which the invention pertains will readily appreciate that numerous changes, modifications and variations may be applied to the above exemplified embodiment. Thus, for example, the elements constituting the eyepiece, beam combiner, optical relay and objective lens system may be substituted by other elements having equivalent functional characteristics. Also, the relative locations of the optical relay and the image intensifier can be interchanged along with requisite modifications to the operation of the flip-flop mirror, location of the aiming reticle projector, etc.

What is claimed is:

1. A unified-body dual-function day/night sight, for rifles and the like comprising a housing incorporating a power supply, a coaxial arrangement of an eyepiece and an objective stationarily mounted in the housing for producing a target image, a parallel combination of an image intensifier and an optical array stationarily mounted in the housing and interposed between said eyepiece and said objective, one of said image intensifier and optical array defining a first image beam path on a longitudinal axis of the sight and the other of said image intensifier and optical array defining a second image beam path parallel to and offset from the longitudinal axis, the improvement comprising in combination:

image beam deflecting means interposed between the parallel combination and the objective such that for nighttime use of the sight, the image beam is applied to the image intensifier and for daytime use of the sight, the image beam is applied to said optical array, the image beam deflecting means comprising:

a single pivotable mirror mounted on an axis extending normal to the longitudinal axis between the objective and the first image beam path;

lever means for moving the mirror between a clear position in which the mirror is swung back clearing entry for the image beam to pass through the first image beam path, and a deflecting position that deflects the image beam at an angle relative to the longitudinal axis;

a first image beam deflector means stationarily mounted in alignment with the second image beam path for receiving the image beam deflected by the mirror when the mirror is in the deflecting position and deflecting the image beam to pass through the second image beam path;

a second image beam deflector means stationarily mounted in alignment with the second image beam path at an end of the second image beam path opposite the first image beam deflector means for receiving the image beam passing through the second image beam path and for deflecting the image beam; and a beam combiner means coaxially and stationarily interposed between the eyepiece and the first image beam path on the longitudinal axis for receiving the image beam deflected by the second image beam deflector means and passing the image beam to the eyepiece when the mirror is in the deflecting position and for receiving and passing the image beam received from the first image beam path to the eyepiece when the mirror is in the clear position.

2. The day/night sight as claimed in claim 1 wherein the image intensifier is in coaxial alignment with said eyepiece and said objective and defines the first image beam path.

3. The day/night sight as claimed in claim 1 wherein the lever means is operable by an externally accessible lever.

4. The day/night sight as claimed in claim 1 further comprising an aiming reticle projector coaxially aligned to said second image beam path such that an aiming reticle beam projected therefrom is applied through the beam combiner means to the eyepiece for illumination of a center of view of an imaged object both when the image deflecting means is positioned for nighttime use and when positioned for daytime use.

5. The day/night sight as claimed in claim 4 wherein the projector is electrically adjustable for the controlling of aiming reticle beam intensity.

6. A day/night sight for rifles and the like comprising in combination:
   a housing incorporating a power supply;
   a coaxial arrangement of an eyepiece and an objective stationarily mounted in the housing on a longitudinal axis of the sight for producing a target image;
   an image intensifier interposed between the eyepiece and the objective on the longitudinal axis;
   an optical array stationarily mounted in the housing offset and parallel to the longitudinal axis;
   a single pivotable mirror mounted on an axis extending normal to the longitudinal axis between the objective and the image intensifier;
   lever means for moving the mirror between a clear position in which the mirror is swung back clearing entry for the image beam to pass through the image beam intensifier for nighttime use, and a deflecting position that deflects the image beam at an angle relative to the longitudinal axis for daytime use;
   a first folding prism stationarily mounted in alignment with the optical array for receiving the image beam deflected by the mirror when the mirror is in the deflecting position and passing the image beam through the optical array;
   a second folding prism stationarily mounted in alignment with the optical array at an end of the optical array opposite the first folding prism for receiving the image beam passing through the optical array and for deflecting the image beam; and
   a beam combiner prism coaxially and stationarily interposed between the eyepiece and the image intensifier on the longitudinal axis for receiving the image beam deflected by the second folding prism and passing the image beam to the eyepiece when the mirror is in the deflecting position and for passing the image beam receiving from the image intensifier when the mirror is in the clear position.

7. A unified-body dual-function day/night sight for rifles and the like, comprising the combination of:
   a housing incorporating a power supply;
   an eyepiece and objecting in coaxial alignment for producing a target image, having interposed therebetween a fixed parallel combination of an image intensifier and optical array, the image intensifier being in coaxial alignment with the eyepiece and objective;
   a set of an externally accessible pivotable mirror and three beam combining prisms, the mirror being interposed between the objective and the image intensifier, mounted on an axis extending normally to a longitudinal axis of the sight and spaced away from the image intensifier, the third prism of the set being interposed between the image intensifier and the eyepiece, and the first and second prisms of the set being appended at each end of the optical array and positioned in vertical alignment to the mirror and third prism respectively, the set being arranged such that for nighttime use the mirror is moved to a clear position to clear entry for the image beam to impinge directly on the image intensifier and pass through the third prism to the eyepiece, and for daytime use the mirror is moved to a deflecting position forming a 45 degree angle relative to the longitudinal axis to deflect the image beam toward the first prism and therefrom to the optical array and eyepiece via the second and third prisms; and
   a single aiming reticle projector mounted in coaxial alignment to the optical array, and arranged such that the aiming reticle beam projected therefrom is applied to the eyepiece for illumination of the center of view of the imaged object irrespective of whether the mirror is in the clear or deflecting position.

* * * * *